(12) United States Patent
Nagai (10) Patent No.: US 9,525,171 B2
(45) Date of Patent: *Dec. 20, 2016

(54) LITHIUM SECONDARY BATTERY INCLUDING TUNGSTEN-CONTAINING LITHIUM COMPLEX OXIDE

(75) Inventor: Hiroki Nagai, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/805,004

(22) PCT Filed: Jun. 17, 2011

(86) PCT No.: PCT/JP2011/063916
§ 371 (c)(1),
(2), (4) Date: Dec. 18, 2012

(87) PCT Pub. No.: WO2011/162178
PCT Pub. Date: Dec. 29, 2011

(65) Prior Publication Data
US 2013/0089787 A1     Apr. 11, 2013

(30) Foreign Application Priority Data
Jun. 21, 2010  (WO) .................. PCT/JP2010/060489

(51) Int. Cl.
*H01M 4/485*  (2010.01)
*H01M 4/505*  (2010.01)
(Continued)

(52) U.S. Cl.
CPC ............. *H01M 4/485* (2013.01); *H01M 4/505* (2013.01); *H01M 4/525* (2013.01);
(Continued)

(58) Field of Classification Search
CPC ...... H01M 4/525; H01M 4/485; H01M 4/505; H01M 10/0525
(Continued)

(56) References Cited

U.S. PATENT DOCUMENTS 6,872,491 B2    3/2005   Kanaai et al.
2002/0001751 A1 1/2002   Doddapaneni et al.
(Continued)

FOREIGN PATENT DOCUMENTS

CN    1943072      4/2007
CN    101305484    11/2008
(Continued)

OTHER PUBLICATIONS

Machine translation of JP 2009-140787, obtained Feb. 20, 2014.*
(Continued)

*Primary Examiner* — Nicholas P D'Aniello
(74) *Attorney, Agent, or Firm* — Finnegan, Henderson, Farabow, Garrett & Dunner, LLP (57) ABSTRACT

Disclosed is a lithium ion secondary battery which includes a positive electrode, a negative electrode and a nonaqueous electrolyte solution. The positive electrode contains, as the positive electrode active material, a lithium-transition metal composite oxide having a layered structure. The positive electrode active material includes at least one metal element $M^0$ from among Ni, Co and Mn, and includes at least one metal element M' from among Zr, Nb and Al, and further includes W. When 2 g of a powder of the positive electrode active material and 100 g of pure water are stirred together to prepare a suspension and the suspension is filtered to obtain a filtrate, the amount of W eluted into the filtrate, as measured by inductively coupled plasma mass spectrometry, is 0.025 mmol or less per gram of filtrate.

12 Claims, 5 Drawing Sheets

(51) Int. Cl.
  *H01M 4/525* (2010.01)
  *H01M 10/0525* (2010.01)

(52) U.S. Cl.
  CPC ....... *H01M 10/0525* (2013.01); *Y02E 60/122* (2013.01); *Y02P 70/54* (2015.11); *Y02T 10/7011* (2013.01)

(58) Field of Classification Search
  USPC ........................... 429/223, 231.1, 231.3, 224
  See application file for complete search history.

(56) References Cited

U.S. PATENT DOCUMENTS

| | | |
|---|---|---|
| 2003/0206852 A1 | 11/2003 | Yang et al. |
| 2007/0212607 A1 | 9/2007 | Fujihara et al. |
| 2007/0218370 A1 | 9/2007 | Deguchi et al. |
| 2009/0035659 A1 | 2/2009 | Takeuchi et al. |
| 2009/0155691 A1 | 6/2009 | Park et al. |
| 2009/0233176 A1 | 9/2009 | Kita et al. |
| 2010/0143802 A1 | 6/2010 | Takei |
| 2012/0270107 A1 | 10/2012 | Toya et al. |

FOREIGN PATENT DOCUMENTS

| | | |
|---|---|---|
| CN | 101662025 | 3/2010 |
| JP | 2003-68306 | 3/2003 |
| JP | 2007-273448 | 10/2007 |
| JP | 2007-299668 | 11/2007 |
| JP | 2008/053054 | 3/2008 |
| JP | 2008-243448 | 10/2008 |
| JP | 2008243448 A * | 10/2008 |
| JP | 2008-270086 | 11/2008 |
| JP | 2009-140787 | 6/2009 |
| JP | 2011-116580 | 6/2011 |

OTHER PUBLICATIONS

Machine translation of JP 2008-243448A, obtained Jun. 24, 2015.*
Office Action for U.S. Appl. No. 13/060,305 dated Aug. 14, 2013.
Office Action for U.S. Appl. No. 13/060,305 dated Mar. 7, 2014.
Office Action for U.S. Appl. No. 13/060,305 dated Jul. 23, 2014.
Office Action for U.S. Appl. No. 13/060,305 dated Mar. 6, 2015.
Notice of Allowance and Fee(s) Due and Notice of Allowability for U.S. Appl. No. 13/060,305 dated Jul. 14, 2015.
Office Action issued in U.S. Appl. No. 13/060,305 on Feb. 19, 2016.
Notice of Allowance issued in U.S. Appl. No. 13/060,305 dated Jun. 15, 2016.

* cited by examiner

LITHIUM SECONDARY BATTERY INCLUDING TUNGSTEN-CONTAINING LITHIUM COMPLEX OXIDE

TECHNICAL FIELD

The present invention relates to a lithium ion secondary battery having excellent power characteristics and cycle performance. This application is a national phase application of International Application No. PCT/JP2011/063916, filed Jun. 17, 2011, and claims priority from International Application No. PCT/JP2010/060489 filed on Jun. 21, 2010, the entire contents of both of which are incorporated herein by reference.

BACKGROUND ART

Lithium ion secondary batteries have a positive electrode, a negative electrode, and a nonaqueous electrolyte solution interposed between both electrodes. Charging and discharging is carried out by having lithium ions within the electrolyte solution come and go between the electrodes. A lithium-containing transition metal oxide is primarily used as the active material which reversibly store and release lithium ions at the positive electrode. The technical literature relating to positive electrode materials includes Patent Literatures 1 and 2.

CITATION LIST

Patent Literature

Patent Literature 1: Japanese Patent Application Laid-open No. 2009-140787
Patent Literature 2: Japanese Patent Application Laid-open No. 2007-273448

Along with the growing use of lithium ion secondary batteries in recent years, improvements in various performance according to the particular applications have been desired. For example, in applications such as automobiles which are capable of repeated output and input at a high rate, even better power characteristics and durability (cycle performance, etc.) are desired. It would be particularly useful for lithium ion secondary batteries to be provided which have excellent power characteristics, not only at room temperature but also at low temperatures (e.g., −10° C. or below), and which have a high durability (cycle performance, etc.) even at relatively high temperatures (e.g., about 60° C.).

SUMMARY OF INVENTION

Accordingly, one object of the present invention is to provide lithium ion secondary batteries which achieve both excellent power characteristics and an excellent cycle performance.

The invention provides a lithium ion secondary battery having a positive electrode, a negative electrode and a nonaqueous electrolyte solution. The positive electrode includes, as a positive electrode active material, a lithium-containing composite oxide (typically a lithium-transition metal composite oxide which contains transition metals as the constituent metal elements) having a layered structure (typically, a rock salt-type crystal structure). The positive electrode active material contains at least one metal element $M^0$ from among nickel (Ni), cobalt (Co) and manganese (Mn), contains at least one metal element M' from among zirconium (Zr), niobium (Nb) and aluminum (Al), and contains also tungsten (W). When 2 g of a powder of the positive electrode active material and 100 g of pure water are stirred together to prepare a suspension and the suspension is filtered to obtain a filtrate, the amount of tungsten eluted into the filtrate, as measured by inductively coupled plasma mass spectrometry (ICP-MS), is 0.025 mmol or less per gram of the positive electrode active material. According to another aspect, the invention provides a positive electrode active material which contains above $M^0$, M' and W, and which satisfies the above amount of eluted tungsten.

Another lithium ion secondary battery provided by the invention has a positive electrode, a negative electrode and a nonaqueous electrolyte solution. The positive electrode includes, as a positive electrode active material, a lithium-containing composite oxide (lithium-transition metal composite oxide) represented by general formula (I): $Li_xNi_aCo_bMn_cM'_dM''_eO_2$. In formula (I), M' is at least one selected from among Zr, Nb and Al; and M'' is at least one of W and molybdenum (Mo). In a preferred embodiment, M'' includes at least W. Substantially all of the M'' (based on the number of atoms, at least 95%, such as 98% or more, and even 100%) may be W. In addition, x satisfies the condition $1.0 \le x \le 1.25$; a, b, c, d and e satisfy the conditions $a+b+c+d+e=1$ and $0.001 \le (d+e) \le 0.02$; and at least one of a, b and c is larger than 0. A lithium-containing composite oxide in which at least a is larger than 0 (that is, at least Ni is included) is preferred. Also, d is larger than 0 (i.e., d>0), and e is larger than 0 (i.e., e>0). This lithium ion secondary battery is additionally characterized in that the positive electrode active material exhibits a tungsten elution of 0.020 mmol per gram or less. The tungsten elution per gram of the positive electrode active material is obtained by stirring together 2 g of a powder of the positive electrode active material and 100 g of pure water to prepare a suspension, filtering the suspension to obtain a filtrate, measuring the filtrate by ICP-MS. In a preferred embodiment of the positive electrode active material in the art disclosed herein, M'' includes at least W (e.g., substantially all of M'' is W), and the amount of W eluted is 0.025 mmol or less.

Because this lithium ion secondary battery is characterized in that the positive electrode active material includes both M' and M'' in the specific above-indicated amounts and in that the amount of M'' eluted is 0.025 mmol/g or less, it is capable of having a low reaction resistance and excellent power characteristics both at room temperature (25° C.) and at low temperatures of about −30° C. At the same time, it is also capable of having an excellent durability (e.g., cycle performance) in high-rate charge and discharge at relatively high temperatures (about 60° C.).

In above general formula (I), it is preferable for M' to be substantially all Zr, and it is preferable for M'' to be substantially all W. Also, in above general formula (I), x may satisfy the condition $1.0 \le x \le 1.20$ (e.g., $0.05 \le x \le 1.20$); a may satisfy the condition $0.1 < a \le 1$ (e.g., $0.3 < a < 0.9$, and preferably $0.3 < a < 0.6$); b may satisfy the condition $0 \le b \le 0.5$ (e.g., $0.1 < b < 0.4$, and preferably $0.3 < b < 0.6$); and c may satisfy the condition $0 \le c \le 0.5$ (e.g., $0.1 < c < 0.4$, and preferably $0.3 < c < 0.6$). The art disclosed herein is also applicable to lithium ion secondary batteries containing, as the positive electrode active material, a lithium-containing composite oxide of an average composition which, in addition to above general formula (I), includes also other elements (one, two or more selected from among, for example, chromium, iron, vanadium, titanium, copper, zinc, gallium, indium, tin, lanthanum, cerium, calcium, magnesium and sodium).

The lithium ion secondary battery disclosed herein may be one which, in a SEM-EDX image (e.g., at a magnification of about 1000×) of the surface of the positive electrode active material layer (typically, the positive electrode sheet surface) taken according to the procedure and conditions described in the examples, exhibits no distinct deviations (such as aggregates) in the elemental distribution for at least M" (e.g., W). It is preferable that no distinct deviations (such as aggregates) be observed in the elemental distributions for any of M" and M' (e.g., Zr).

The positive electrode active material in the art disclosed herein may be in the form of secondary particles composed of agglomerated primary particles of a lithium-transition metal composite oxide having a layered structure. In a preferred embodiment, the M" (e.g., W) in the positive electrode active material is disproportionally present (distributed) at the surface of such primary particles (that is, concentrated more at the surface than at the interior of the primary particles). A positive electrode active material which contains W, in which the W is disproportionately distributed at the surface of primary particles of the lithium-transition metal composite oxide, and moreover in which there is no distinct deviation in the distribution of W at the surface of the positive electrode active material particles (and, in turn, at the surface of the positive electrode active material layer obtained using the positive electrode active material) is preferred. Such positive electrode active materials have a low amount of W elution and enable high-performance batteries to be achieved.

The invention further provides a method of producing any of the positive electrode active materials disclosed herein (e.g., positive electrode materials for lithium ion secondary batteries). This method of production includes preparing an aqueous solution $Aq_A$ containing $M^0$ and M', preparing an aqueous solution $Aq_C$ containing W, and of mixing the aqueous solution $Aq_A$ and the aqueous solution $Aq_C$ under alkaline conditions (e.g., while maintaining a pH of between 11 and 14) and inducing the precipitation of a hydroxide (precursor) containing $M^0$, M' and tungsten. This production method may further include mixing the hydroxide with a lithium compound, and firing the resulting mixture to produce a lithium-transition metal composite oxide.

The invention still further provides another method of producing any of the positive electrode active materials disclosed herein, which method includes:

(A) preparing a precursor (ii) represented by general formula (II): $Ni_aCo_bMn_cM'_dM''_e(OH)_{2+\alpha}$ by effect wet mixing conducted by adding at desired rates both an aqueous solution containing a nickel salt, a cobalt salt, a manganese salt and a M'-containing salt at given respective concentrations and an aqueous solution containing a M"-containing salt at a given concentration to a basic aqueous solution having a pH between 11 and 14 so as to prepare a reaction mixture, then stirring the mixture; and (B) preparing a lithium-containing composite oxide (i) represented by general formula (I) by firing a mixture of the precursor (ii) and a lithium salt.

In above formula (II), M' is at least one selected from among Zr, Nb and Al; and M" is at least one of W and Mo. In a preferred embodiment, M" includes at least W. Substantially all of M" (based on the number of atoms, at least 95%, such as 98% or more, and even 100%) may be W. In addition, a, b, c, d and e satisfy the conditions $a+b+c+d+e=1$ and $0.001 \leq (d+e) \leq 0.02$; at least one of a, b and c is larger than 0; d is larger than 0 (that is, $d>0$); e is larger than 0 (that is, $e>0$); and $\alpha$ satisfies the condition $0 \leq \alpha \leq 0.5$. The positive electrode active material can be advantageously produced by this method. In addition, the ratio d:e is preferably from about 2:1 to about 1:10, and the ratio a:b:c is not subject to any particular limitation. It is preferable for at least a to be larger than 0 (i.e., for at least Ni to be present).

In above general formula (II), a may satisfy the condition $0.1<a\leq 1$ (e.g., $0.3<a<0.9$, and preferably $0.3<a<0.6$), b may satisfy the condition $0 \leq b \leq 0.5$ (e.g., $0.1<b<0.4$, and preferably $0.3<b<0.6$), and c may satisfy the condition $0 \leq c \leq 0.5$ (e.g., $0.1<c<0.4$, and preferably $0.3<c<0.6$).

As mentioned above, because any one of the lithium ion secondary batteries disclosed herein has excellent power characteristics at room temperature and even at low temperatures, and also has a good durability even at high temperatures, it is well-suited for use as a power supply in vehicles. Therefore, the invention also provides a vehicle equipped with any of the lithium ion secondary batteries disclosed herein. A vehicle (e.g., an automobile) equipped with such a lithium ion secondary battery as the power source (typically, the power source for a hybrid vehicle or an electric vehicle) is especially preferred.

DESCRIPTION OF EMBODIMENTS

Preferred embodiments of the invention are described below. Matters not specifically mentioned in the specification but necessary for carrying out the invention will be understood as matters of design by persons of ordinary skill in the art which are based on prior art in the field. The present invention can be carried out based on details disclosed in the specification and on common general technical knowledge in the field.

A lithium-containing composite oxide (i) of above general formula (I) is included as a positive electrode active material in a preferred embodiment of the lithium ion secondary battery disclosed herein. In above formula (I), M' is preferably Zr, M" is preferably W, the molar ratio of M' to M" (i.e., d:e) is preferably from about 2:1 to about 1:10, and the ratio a:b:c is not subject to any particular limitation.

The above lithium ion secondary battery is characterized in that when 2 g of a powder of the positive electrode active material and 100 g of pure water are stirred together to prepare a suspension and the suspension is filtered to obtain a filtrate, the amount of M" eluted into the filtrate, as measured by ICP-MS, is 0.025 mmol or less per gram of the positive electrode active material. The amount of M" eluted is preferably 0.020 mmol/g or less. When the positive electrode active material powder is dispersed and stirred in pure water, the elution of a smaller amount of M" into the water suggests that more M" elements are taken up into the crystal structure of the positive electrode active material. If the amount of M" eluted is too large, satisfactory power characteristic and cycle performance improving effects may not be achieved in lithium ion secondary batteries obtained using this positive electrode active material. When measuring the amount of M" eluted, stirring should be carried out for about 1 to 6 minutes.

The lithium ion secondary battery disclosed herein may be one which, in a SEM-EDX image of the surface of the positive electrode active material layer (typically the positive electrode sheet surface) taken according to the procedure and conditions described in the examples, exhibits no distinct deviations (such as aggregates) in the elemental distributions for M' and M".

The positive electrode active material in the art disclosed herein may be in the form of secondary particles composed of agglomerated primary particles of lithium-transition metal composite oxides having a layered structure. In a preferred embodiment, the positive electrode active material includes W, which W is disproportionally present (distributed) at the surface of such primary particles (that is, concentrated more at the surface than at the interior of the primary particles).

Here, for W to be "disproportionately present at the surface of primary particles" means that W is present (distributed) in a greater concentration at the surface of primary particles (grain boundaries) than at the interior of primary particles. Hence, this does not signify solely forms in which W is present only at the grain boundaries (i.e., in which no W is present on the interior of primary particles). That W is disproportionately present at the surface of primary particles can be understood from, for example, the fact that, when the distribution of W is mapped for particles (secondary particles) of the active material using energy-dispersive X-ray spectroscopy (EDX), the concentrated presence of W at the grain boundaries (the amount of W present per unit surface area is higher at the grain boundaries than at the interior of the primary particles) is apparent in the mapping results. The positions of the grain boundaries (surfaces of the primary particles) can be determined by, for example, the transmission electron microscopic (TEM) observation of cross-sections of positive electrode active material particles. Preferred use may be made of TEM with EDX.

As for the method of manufacturing the positive electrode active material disclosed herein (e.g., above composite oxide (i)), a suitable method in which the amount of M" eluted, measured as described above, is 0.025 mmol/g or less could be adopted.

In one embodiment of the foregoing production method, the positive electrode active material can be formed by mixing the precursor (ii) prepared by wet mixing with a suitable lithium salt, then firing the mixture at a given temperature. Here, "wet mixing" refers to the addition, mixture and stirring at a desired rate of an aqueous solution containing a nickel salt, a cobalt salt, a manganese salt and an M'-containing salt (sometimes referred to below as the "NiCoMnM' aqueous solution") and an aqueous solution containing a M"-containing salt (sometimes referred to below as the "M" aqueous solution") into a basic aqueous solution having an initial pH between 11 and 14 while maintaining the initial pH. It is preferable at this time to set the temperature of the reaction mixture in the range of 20 to 60° C.

By using the precursor (ii) obtained by a wet mixing technique like that described above to form the above composite oxide (i), a lithium-containing composite oxide (i) for which the above amount of M" eluted is 0.025 mmol/g or less can be advantageously formed. Such a composite oxide has a more uniform distribution of M' elements and M" elements at the interior of the crystals and/or at the surface of the crystals, and thus may be a composite oxide in which the segregation of these elements has been suppressed. Lithium ion secondary batteries in which such a composite oxide is used as the positive electrode active material are capable of having both excellent power characteristics and an excellent cycle performance. When such a precursor (ii) and a lithium salt are mixed, either wet mixing or dry mixing without the use of a solvent may be employed. From the standpoint of convenience and cost, dry mixing is preferred. Both a positive electrode active material produced by this method, and lithium ion secondary batteries having a positive electrode containing as the primary ingredient a positive electrode active material produced by such a method are encompassed by the scope of the present invention.

It is preferable to use as the basic aqueous solution one which contains a strong base (e.g., an alkali metal hydroxide) and a weak base (e.g., ammonia), which maintains a pH of between about 11 and 14 at a solution temperature of 25° C. when given amounts of the NiCoMnM' aqueous solution and the M" aqueous solution are added, and which does not hinder formation of the precursor (ii). A mixed solution of an aqueous solution of sodium hydroxide and ammonia water is typically used. The mixed solution has a pH in the range of 11 to 14 (e.g., a pH of about 12), and preferably has an ammonia concentration of from 3 to 25 g/L.

In the course of forming a reaction mixture by adding the NiCoMnM' aqueous solution and the M" aqueous solution to the basic aqueous solution and causing the precursor (ii) forming reaction to proceed, it is preferable to maintain the ammonia concentration of the reaction mixture at about 3 to 25 g/L.

The NiCoMnM' aqueous solution may be prepared by dissolving the desired nickel salt, cobalt salt, manganese salt and M'-containing salt in respective given amounts within an aqueous solvent. The order in which these salts are added to the aqueous solvent is not particularly limited. Preparation may also be carried out by mixing aqueous solutions of the respective salts. Alternatively, an aqueous solution of a M'-containing salt may be added to an aqueous solution containing a nickel salt, a cobalt salt and a manganese salt. The anions of these metal salts (the above nickel salt, cobalt salt, manganese salt and M'-containing salt) may be selected in such a way as to have the respective salts achieve the desired water solubilities. For example, the anions may be sulfuric acid ions, nitric acid ions or chloride ions. That is, the metal salts may be sulfuric acid salts, nitric acid salts, hydrochloric acid salts or the like of, respectively, nickel, cobalt, manganese and M'. Some or all of the anions of these metal salts may be the same, or may mutually differ. These salts may each be solvates such as hydrates. The order of addition for these metal salts is not particularly limited. It is preferable for the NiCoMnM' aqueous solution to have a total concentration of all the transition metals combined (Ni, Co, Mn, M') of from about 1 to about 2.2 mol/L.

The above M" aqueous solution may be prepared by similarly dissolving a given amount of a M"-containing salt in an aqueous solvent. The M″-containing salt used is typically a salt of an oxoacid in which M″ serves the central element (e.g., tungstic acid, molybdic acid). The cation included in the M″-containing salt may be selected so that the salt is water soluble. Examples include ammonium ions, sodium ions and potassium ions. For example, ammonium para tungstate may be preferably used. The M″-containing salt may be a solvate such as a hydrate. The concentration of the M″-containing aqueous solution, based on the M″ element, is preferably from about 0.01 mol/L to about 1 mol/L.

The aqueous solvent used when preparing the NiCoMnM′ aqueous solution and the M″ aqueous solution is typically water. Depending on the solubilities of the respective salts to be used, water containing a reagent (e.g., an acid or base) which improves the solubility may be used. For example, when M′ is Nb, the use of water containing a suitable concentration of acid (e.g., oxalic acid) is preferred. In this embodiment, the NiCoMnM′ aqueous solution may be prepared by adding a niobium salt-containing acidic aqueous solution to an aqueous solution of a nickel salt, a cobalt salt and a manganese salt.

The amounts in which the nickel salt, cobalt salt, manganese salt and M″-containing salt are used may be suitably set based on the molar ratio of Ni, Co, Mn, M′ and M″ that has been selected so as to satisfy the desired ratio of a, b, c, d, and e in above formula (I).

In the production of the composite oxide (i), a salt containing M′ and M″ (e.g., an M″ oxoacid salt containing M′ cations) may be precipitated by merely mixing together an aqueous solution of the M′-containing salt and the aqueous solution of the M″-containing salt (typically, a salt of an M″ oxoacid). Alternatively, by dissolving in water an M″-containing salt instead of an M′-containing salt, together with a nickel salt, a cobalt salt and a manganese salt, a salt containing Ni, Co, Mn and M″ (an M″ oxoacid salt containing Ni, Co and Mn cations) may be precipitated. By preparing a NiCoMnM′ aqueous solution (typically, an acidic solution) and a M″ aqueous solution (e.g., a W aqueous solution) as separate solutions, then mixing these together under alkaline conditions, a hydroxide (a lithium-transition metal composite oxide precursor) suitable for the production of a positive electrode active material in which M″ (e.g., W) is disproportionally distributed at the surfaces of lithium-transition metal composite oxide crystals (the surfaces of primary particles; i.e., the grain boundaries) can be obtained. Moreover, in cases where, for example, a composite hydroxide containing Ni, Co and Mn that has been prepared by a conventional method, a M′-containing salt and a M″-containing salt are dry-mixed together (that is, mixed in the form of powdery solids, without using a solvent), and the resulting mixture is fired, the distribution of M′ and/or M″ may become non-uniform.

The precursor (ii) which has been made to precipitate out by mixing together the above basic aqueous solution, NiCoMnM′ aqueous solution and M″ aqueous solution under pH control at a given rate may, following the completion of crystal deposition, be rinsed, collected by filtration and dried to prepare it in a particular form having a desired particle size. It is preferable to heat the precursor (ii) for a predetermined period (e.g., from 5 to 24 hours) in an open-air atmosphere at a temperature of 100 to 300° C., then furnish it for the next step.

The composite oxide (i) can be formed by firing a mixture of the precursor (ii) and a suitable lithium salt, typically in air. An ordinary lithium salt used to form lithium composite oxides may be used without particular limitation as the lithium salt. Specific examples include lithium carbonate and lithium hydroxide. These lithium salts may be used singly or two or more may be used in combination. The mixing ratio of the precursor (ii) and the lithium salt may be suitably set based on the number of moles of lithium salt that has been selected relative to the combined number of moles of all the transition metals included in the precursor (ii) so that (a+b+c+d+e):x in formula (I) becomes a desired ratio.

The firing temperature is preferably set in a range of about 700 to 1,000° C. Firing may be carried out once at the same temperature or may be carried out in stages at different temperatures. The firing time may be suitably selected. For example, firing may be carried out at about 700 to 800° C. for about 1 to 12 hours, and again at about 800 to 1,000° C. for about 2 to 24 hours.

The lithium-containing composite oxide (i) thus obtained may be ground, then optionally screened to a desired particle size, and furnished for use. It is preferable for the average particle size of the composite oxide (i) used as a positive electrode active material to be generally from about 3 μm to 7 μm. The specific surface area is preferably in the range of 0.5 to 1.8 $m^2/g$. The tap density is preferably in the range of from 1 to 2.2 $g/cm^3$.

The invention provides lithium ion secondary batteries which are characterized by having a positive electrode containing any one of the positive electrode active materials disclosed herein. A lithium ion secondary battery 100 (FIG. 1) having a structure of an electrode assembly and a non-aqueous electrolyte solution are housed in a prismatic battery case is described below as an embodiment of such a lithium ion secondary battery, although the art disclosed herein is not limited by this embodiment. That is, no particular limitation is imposed on the shape of the lithium ion secondary battery disclosed herein; the materials, shape, size and other characteristics of the battery case, electrode assembly and the like may be suitably selected according to the intended use and capacity. For example, the battery case may have a rectangular shape, a flattened shape, or a cylindrical shape. In the following figures, members or parts having like functions are designated by like symbols, and repeated explanations may be omitted or simplified. Also, the dimensional relationships (lengths, widths, thicknesses, etc.) in the respective figures do not necessarily reflect the actual dimensional relationships.

Figure 1:
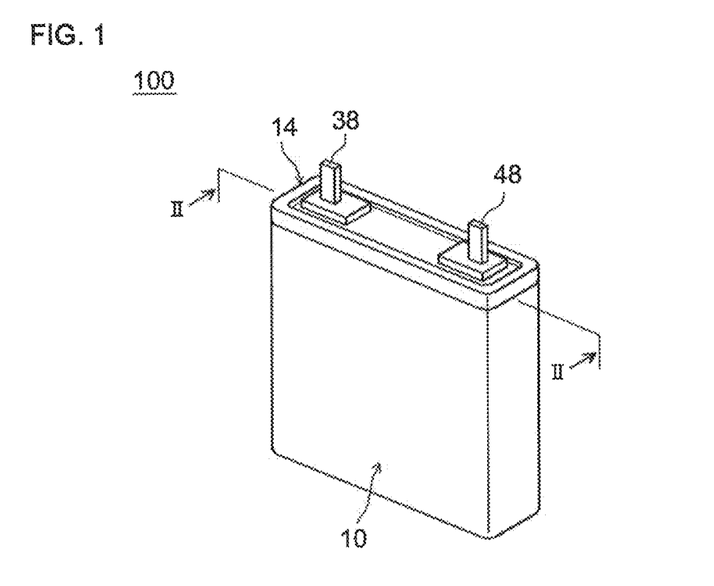
FIG. 1 is a perspective view which schematically shows the outside shape of a lithium ion secondary battery according to one embodiment of the invention.
Figure 2:
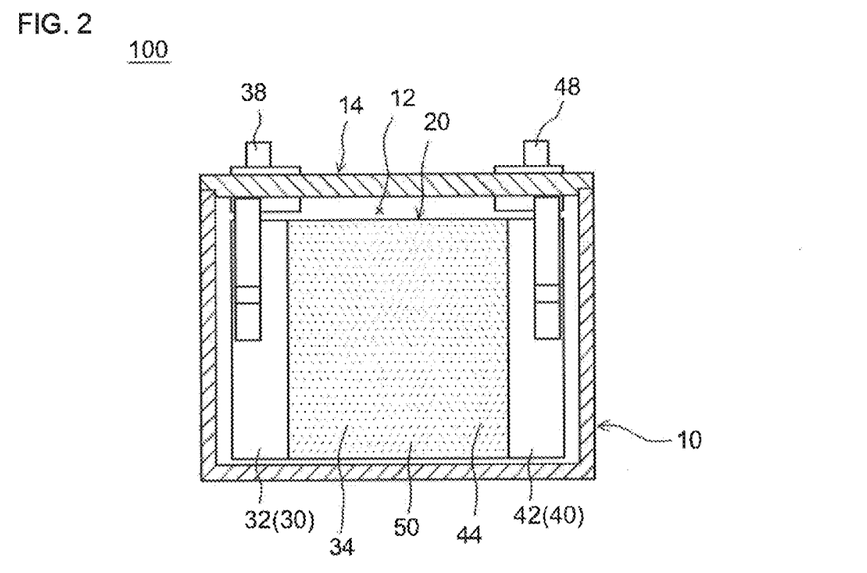
FIG. 2 is a sectional view taken along line II-II in FIG. 1.
Figure 3:
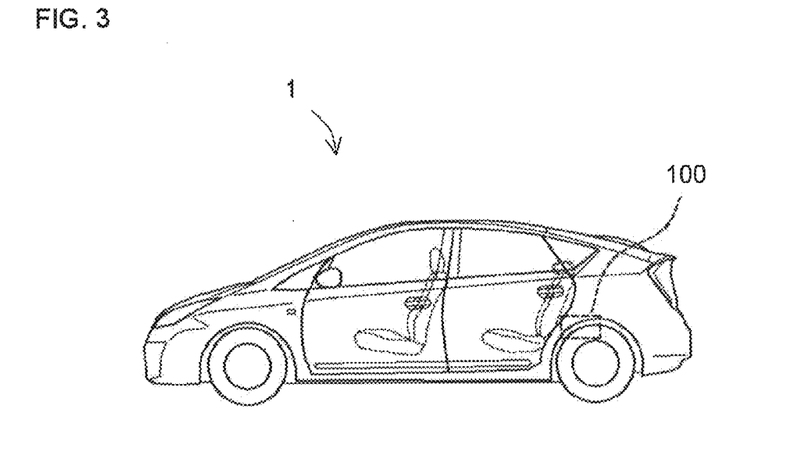
FIG. 3 is a side view which schematically shows a vehicle (automobile) equipped with the lithium ion secondary battery of the invention.

The lithium ion secondary battery 100, as shown in FIGS. 1 and 2, may be constructed by housing via an opening 12 a coiled electrode assembly 20, together with an electrolyte solution (not shown), in a flat, box-like battery case 10 corresponding to the shape of the electrode assembly 20, and closing the opening 12 in the case 10 with a lid 14. To the lid 14, a positive electrode terminal 38 and a negative electrode terminal 48 for connection to the exterior are provided in such a way that portions of these terminals project out onto a surface side of the lid 14.

The electrode assembly 20 is obtained by stacking and coiling a positive electrode sheet 30 having a positive electrode active material layer 34 on the surface of a continuous sheet-shaped positive electrode current collector 32 and a negative electrode sheet 40 having a negative electrode active material layer 44 on the surface of a continuous sheet-shaped negative electrode current collector 42 together with two continuous sheet-shaped separators 50 and laterally pressing and deforming the resulting coiled assembly into a flattened shape.

The positive electrode sheet 30 is formed in such a way that the positive electrode active material layer 34 has not been provided (or has been removed) at one end in the lengthwise direction thereof so as to leave the positive electrode current collector 32 exposed. Similarly, the negative electrode sheet 40 to be coiled is formed in such a way that the negative electrode active material layer 44 has not been provided (or has been removed) at one end in the lengthwise direction thereof so as to leave the negative electrode current collector 42 exposed. A positive electrode terminal 38 is joined to the exposed end of the positive electrode current collector 32, and a negative electrode terminal 48 is joined to the exposed end of the negative electrode current collector 42, and these are electrically connected to the positive electrode sheet 30 or the negative electrode sheet 40 of the coiled electrode assembly 20 that has been formed into the above flattened shape. The positive and negative electrode terminals 38, 48 and the positive and negative electrode current collectors 32, 42 may be respectively joined by, for example, ultrasonic welding or resistance welding.

The positive electrode sheet 30 can be preferably produced by, for example, applying onto the positive electrode current collector 32 a composition in a state of paste or slurry (positive electrode mixture) obtained by dispersing any one of the positive electrode active materials disclosed herein, together with optional ingredients such as a conductive material and a binder, in a suitable solvent and drying the composition.

An electrically conductive powder material such as carbon powder or carbon fibers can preferably be used as the conductive material. The carbon powder may preferably be any of various carbon blacks, such as acetylene black, furnace black, Ketjenblack or graphite powder. A single conductive material may be used alone, or two or more may be used in combination. The amount of conductive material included in the positive electrode active material layer may be suitably selected. For example, this amount may be set to from about 5 to 12 wt %.

The binder may be suitably selected from among, for example, water-soluble polymers which dissolve in water, polymers which disperse in water, and polymers which dissolve in nonaqueous solvents (organic solvents). A single binder may be used alone, or two or more may be used in combination.

Illustrative examples of water-soluble polymers include carboxymethyl cellulose (CMC), methyl cellulose (MC), cellulose acetic phthalate (CAP), hydroxypropylmethyl cellulose (HPMC), hydroxypropylmethyl cellulose phthalate (HPMCP) and polyvinyl alcohol (PVA).

Illustrative examples of water-dispersible polymers include fluorinated resins such as polytetrafluoroethylene (PTFE), tetrafluoroethylene-perfluoroalkylvinyl ether copolymers (PFA), tetrafluoroethylene-hexafluoropropylene copolymers (FEP) and ethylene-tetrafluoroethylene copolymers (ETFE); vinyl acetate copolymers; and rubbers such as styrene-butadiene block copolymers (SBR), acrylic acid-modified SBR resins (SBR latex) and gum arabic.

Illustrative examples of polymers which dissolve in nonaqueous solvents (organic solvents) include polyvinylidene fluoride (PVDF), polyvinylidene chloride (PVDC), polyethylene oxide (PEO), polypropylene oxide (PPO) and poly (ethylene oxide-propylene oxide) copolymers (PEO-PPO).

The amount of binder included in the positive electrode active material layer may be suitably selected and can be set to, for example, from about 1.5 to 10 wt %.

An electrically conductive member composed of a metal having a good conductivity may be advantageously used as the positive electrode current collector 32. For example, use may be made of aluminum or an alloy composed primarily of aluminum. The shape of the positive electrode current collector 32 may vary depending on the shape of the lithium ion secondary battery, and thus is not subject to any particular limitation. Illustrative examples include various forms in the shape of a rod, plate, sheet, foil or mesh. In the present embodiment, a sheet-shaped positive electrode current collector 32 made of aluminum can be used, and may be advantageously used in the lithium ion secondary battery 100 having a coiled electrode assembly 20. In such an embodiment, preferred use may be made of an aluminum sheet having a thickness of from about 10 μm to 30 μm.

The negative electrode sheet 40 can be preferably produced by, for example, applying onto the negative electrode current collector 42 a composition in a state of paste or slurry (negative electrode mixture) obtained by dispersing, for example, a negative electrode active material, together with optional ingredients such as a binder in a suitable solvent, and drying the composition.

One, two or more substances hitherto used in lithium ion secondary batteries may be used without particular limitation as the negative electrode active material. An example of a suitable negative electrode active material is carbon particles. A granular carbon material (carbon particles) containing a graphite structure (layered structure) in at least a portion thereof may be advantageously used. Graphitic materials (graphite), non-graphitizable carbonaceous materials (hard carbon), readily graphitizable carbonaceous materials (soft carbon), and materials having a structure that represents a combination of these may be advantageously used. Of these, especially preferred use may be made of graphite particles such as natural graphite.

The binder may be similar to that in the above-described positive electrode. A single binder may be used alone, or two or more may be used in combination. The amount of binder included in the negative electrode active material layer may be suitably selected, and can be set to, for example, from about 1.5 to 10 wt %.

An electrically conductive member composed of a metal having a good conductivity may be preferably used in the negative electrode current collector 42. For example, use may be made of copper or an alloy composed primarily of copper. The shape of the negative electrode current collector 42 may vary depending on the shape of the lithium ion secondary battery, and thus is not subject to any particular limitation. Illustrative examples include various forms in the shape of a rod, plate, sheet, foil and mesh. In the present embodiment, a sheet-shaped negative electrode current collector 42 made of copper can be used, and may be advantageously used in the lithium ion secondary battery 100 having a coiled electrode assembly 20. In such an embodiment, preferred use may be made of a copper sheet having a thickness of from about 6 μm to 30 μm.

The nonaqueous electrolyte solution includes an electrolyte (supporting salt) within a nonaqueous solvent (organic solvent). A lithium salt capable of being used as an electrolyte may be suitably selected and used as this electrolyte in ordinary lithium ion secondary batteries. Examples of such lithium salts include $LiPF_6$, $LiBF_4$, $LiClO_4$, $LiAsF_6$, $Li(CF_3SO_2)_2N$ and $LiCF_3SO_3$. These lithium salts may be used singly, or two or more may be used in combination. $LiPF_6$ is especially preferred. It is advantageous for the nonaqueous electrolyte solution to be prepared to an electrolyte concentration in the range of, for example, 0.7 to 1.3 mol/L.

An organic solvent capable of being used in ordinary lithium ion secondary batteries may be suitably selected and used as the nonaqueous solvent. Examples of especially preferred nonaqueous solvents include carbonates such as ethylene carbonate (EC), diethylene carbonate (DEC), dimethyl carbonate (DMC), ethyl methyl carbonate (EMC), vinylene carbonate (VC) and propylene carbonate (PC). These organic solvents may be used singly or two or more may be used in combination. For example, a mixed solvent of EC and DEC may be advantageously used.

The separator 50 is a layer interposed between the positive electrode sheet 30 and the negative electrode sheet 40. It typically is in the form of a sheet, and is disposed so as to be in contact with, respectively, the positive electrode active material layer 34 on the positive electrode sheet 30 and the negative electrode active material layer 44 on the negative electrode sheet 40. The role of the separator 50 is to prevent short-circuiting associated with contact between both electrode active material layers 34, 44 on the positive electrode sheet 30 and the negative electrode sheet 40, and to form a conduction path between the electrodes by impregnating the electrolyte solution into voids within the separator 50. Separators known to the art may be used without particular limitation as this separator 50. For example, preferred use may be made of porous sheets (microporous resin sheets) composed of a resin. Preferred examples include porous polyolefin resin sheets of polyethylene (PE), polypropylene (PP) or polystyrene. The use of a PE sheet, a PP sheet, or a sheet having a multilayer structure with a layered structure of a PE layer and a PP layer is especially preferred. The thickness of the separator is preferably set in the range of, for example, about 10 μm to 40 μm.

Several examples relating to the invention are described below, although these examples are not intended to limit the scope of the invention. Unless noted otherwise, all references to "parts" and "%" in the following description are based on weight.

Example 1

A reaction vessel equipped with a stirrer and a nitrogen inlet was filled about half-way with water, then heated under stirring to 40° C. The reaction vessel was flushed with nitrogen, after which a 3.25% aqueous sodium hydroxide solution and 25% ammonia water were each added in suitable amounts under a stream of nitrogen gas so as to adjust the pH at a liquid temperature of 25° C. to 12.0 and the ammonia concentration in the liquid phase to 20 g/L, thereby giving a basic aqueous solution. The oxygen concentration within the reaction vessel was about 2.0%.

An aqueous solution of NiCoMnZr was prepared by dissolving nickel sulfate, cobalt sulfate, manganese sulfate and zirconium sulfate in water so as to set the elemental molar ratio Ni:Co:Mn:Zr therebetween to 0.33:0.33:0.33:0.005 and bring the total concentration of these transition metals to 1.8 mol/L.

An aqueous solution of tungsten having a tungsten concentration of 0.05 mol/L was prepared by dissolving ammonium paratungstate in water.

The NiCoMnZr aqueous solution and the aqueous solution of tungsten were added to the above basic aqueous solution and mixed while maintaining the pH at 12.0, thereby giving a hydroxide in which the elemental molar ratio Ni:Co:Mn:Zr:W was 0.33:0.33:0.33:0.005:0.005 ($Ni_{0.33}Co_{0.33}Mn_{0.33}Zr_{0.005}W_{0.005}(OH)_{2+\alpha}$ ($0 \leq \alpha \leq 0.5$; precursor). Particles of the above hydroxide were heated for 12 hours in an open-air atmosphere at a temperature of 150° C.

Letting the sum of the number of moles of all the transition metals (i.e., Ni, Co, Mn, Zr and W) in the hydroxide be M, lithium carbonate was weighed out in an amount such as to set the molar ratio of lithium to M (Li/M) to 1.15, and mixed with the heat-treated hydroxide particles. The resulting mixture was fired in air containing 21 vol % oxygen, first at 760° C. for 4 hours, then at 950° C. for 10 hours, giving a lithium-containing composite oxide ($Li_{1.15}Ni_{0.33}Co_{0.33}Mn_{0.33}Zr_{0.005}W_{0.005}O_2$). This oxide was ground and screened, giving a positive electrode active material in the form of a powder having an average particle size of 3.9 μm, a specific surface area of 0.98 $m^2/g$ and a tap density of 1.78 $g/cm^3$.

The above positive electrode active material powder, acetylene black (conductive material), and PVDF were mixed in proportions of positive electrode active material: conductive material:PVDF=89:8:3 and N-methyl-2-pyrrolidone (NMP) was added, giving a mixture in the form of a paste. This paste-like mixture was coated onto both sides of a continuous aluminum foil having a thickness of 15 μm so that the collective amount applied to both sides was 12.8 $mg/cm^2$. The applied paste was dried, then rolled, giving a positive electrode sheet having a total thickness of 65 μm.

Natural graphite, SBR and CMC were mixed in a weight ratio of 98:1:1 and ion-exchanged water was added, giving a mixture in the form of a paste. This mixture was coated onto both sides of a continuous copper foil having a thickness of 10 μm so that the collective amount applied to both sides was 8 $mg/cm^2$. The applied paste was dried, then rolled, giving a negative electrode sheet having a total thickness of 68 μm.

The positive electrode sheet and the negative electrode sheet were coiled in the lengthwise direction together with two separators (continuous porous polyethylene sheets having a thickness of 20 μm) to produce an electrode assembly. This electrode assembly was placed, together with a 1 mol/L $LiPF_6$ solution (mixed solvent of EC, DMC and EMC (volume ratio, 1:1:1)) in a cylindrical housing, thereby giving a type 18650 (18 mm diameter, 65 mm height) lithium ion secondary battery.

Example 2

Aside from setting the element molar ratio Ni:Co:Mn:Zr:W to 0.33:0.33:0.33:0.002:0.005, a powdered positive electrode active material having an average particle size of 4.2 μm and a specific surface area of 1.15 $m^2/g$ was obtained in the same way as in Example 1. Apart from using this as the positive electrode active material, the lithium ion secondary battery of the present invention was obtained in the same way as in Example 1.

Example 3

Aside from setting the element molar ratio Ni:Co:Mn:Zr:W to 0.33:0.33:0.33:0.005:0.008, a powdered positive electrode active material having an average particle size of 4.0 μm and a specific surface area of 1.08 $m^2/g$ was obtained in the same way as in Example 1. Apart from using this positive electrode active material, the lithium ion secondary battery of the present invention was obtained in the same way as in Example 1.

Example 4

Aside from setting the element molar ratio Ni:Co:Mn:Zr:W to 0.33:0.33:0.33:0.005:0.01, a powdered positive electrode active material having an average particle size of 4.1 μm and a specific surface area of 1.13 $m^2/g$ was obtained in the same way as in Example 1. Apart from using this positive electrode active material, the lithium ion secondary battery of the present invention was obtained in the same way as in Example 1.

Example 5

A reaction vessel equipped with a stirrer and a nitrogen inlet was filled about half-way with water, then heated under stirring to 40° C. The reaction vessel was flushed with nitrogen, after which a 3.25% aqueous sodium hydroxide solution and 25% ammonia water were each added in suitable amounts under a stream of nitrogen gas so as to adjust the pH at a liquid temperature of 25° C. to 12.0 and the ammonia concentration in the liquid phase to 20 g/L, thereby giving a basic aqueous solution. The oxygen concentration within the reaction vessel was about 2.0%.

Nickel sulfate, cobalt sulfate and manganese sulfate were added to the water in the reaction vessel, stirred and dissolved so as to set the elemental molar ratio Ni:Co:Mn therebetween to 0.33:0.33:0.33 and bring the total concentration of the metals, Ni, Co, and Mn, to 1.8 mol/L. The precipitated product was separated off, rinsed with water and dried, giving a NiCoMn composite hydroxide ($Ni_{0.33}Co_{0.33}Mn_{0.33}(OH)_2$).

The NiCoMn composite hydroxide, lithium carbonate, zirconium oxide and tungsten (VI) oxide were dry mixed without the use of a solvent so as to set the elemental molar ratio Li:Ni:Co:Mn:Zr:W to 1.15:0.33:0.33:0.33:0.005:0.005. This mixture was fired, first at 760° C. for 4 hours, then at 950° C. for 10 hours, in air containing 21 vol % of oxygen, giving a lithium-containing composite oxide. This oxide was ground and screened, giving a positive electrode active material in the form of a powder having an average particle size of 3.8 μm, a specific surface area of 1.05 $m^2/g$ and a tap density of 1.72 $g/cm^3$. Apart from using this positive electrode active material, the lithium ion secondary battery of the present invention was obtained in the same way as in Example 1

Example 6

Aside from setting the element molar ratio Li:Ni:Co:Mn:Zr:W to 1.15:0.33:0.33:0.33:0.005:0.008, a powdered positive electrode active material having an average particle size of 4.0 μm and a specific surface area of 0.99 $m^2/g$ was obtained in the same way as in Example 5. Apart from using this positive electrode active material, the lithium ion secondary battery of the present invention was obtained in the same way as in Example 1.

Measurement of Amount of Eluted Tungsten

The amount of eluted tungsten (mmol/g) was measured according to the above-described method for the powdered positive electrode active materials in the respective examples. The ICP-MS apparatus used was a model ICPM 8500 system manufactured by Shimadzu Corporation. The results are shown in Table 1.

Conditioning Treatment

Each of the batteries was constant-current (CC) charged for 3 hours at the rate of 1/10 C (1 C being the current value at which the battery can be fully charged in 1 hour), then was subjected to three charge-discharge cycles consisting of the step of charging to 4.1 V at a rate of 1/3 C and the step of discharging to 3 V at a rate of 1/3 C.

The measurements described below were carried out on each of the conditioned batteries. These results are shown in Table 1, together with the characteristics of the positive electrode active material and the amount of eluted W.

Measurement of Initial Discharge Capacity

After having been initially charged to a voltage across both terminals of 4.1 V, each of the batteries was CC discharged at 25° C. to a voltage across the terminals of 3 V at a rate of 1 C, then constant-voltage (CV) discharged for 2 hours at the same voltage. After 10 minutes at rest, the battery was CC charged to a voltage across the terminals of 4.1 V at a rate of 1 C, then CV charged for 2.5 hours at the same voltage. After 10 minutes at rest, the battery was then CC discharged to a voltage across the terminals of 3V at a rate of 0.5 C, then CV discharged for 2 hours at the same voltage. The total discharge capacity measured during this CCCV discharge was treated as the initial capacity.

Measurement of Reaction Resistance at 25° C.

Each of the batteries conditioned to a state-of-charge (SOC) of 60% was subjected to alternating-current impedance measurement at a temperature of 25° C., a frequency of 0.001 Hz to 10,000 Hz and an applied voltage of 10 mV, and the reaction resistance (mΩ) at 25° C. was determined by fitting the Nyquist plot to an equivalent circuit.

Measurement of Reaction Resistance at −30° C.

Aside from changing the measurement temperature to −30° C., each of the batteries conditioned to a SOC of 40% was subjected to measurement of the −30° C. reaction resistance (mΩ) under the same conditions as described above.

High-Temperature Cycle Test

Each of the batteries conditioned to a SOC of 100% was subjected to 1,000 charge-discharge cycles at a temperature of 60° C., each cycle consisting of the step of CC discharging to a voltage of 3 V at a rate of 4 C, followed by the step of CC charging to a voltage of 4.1 V at a rate of 4 C. At the completion of 1,000 cycles, the battery was CC discharged to a voltage of 3 V at a rate of 4 C, and the discharge capacity at that time was measured. The percentage of the discharge capacity following cycle completion relative to the initial capacity was determined as the capacity retention.

SEM-EDX Analysis

Figure 4:
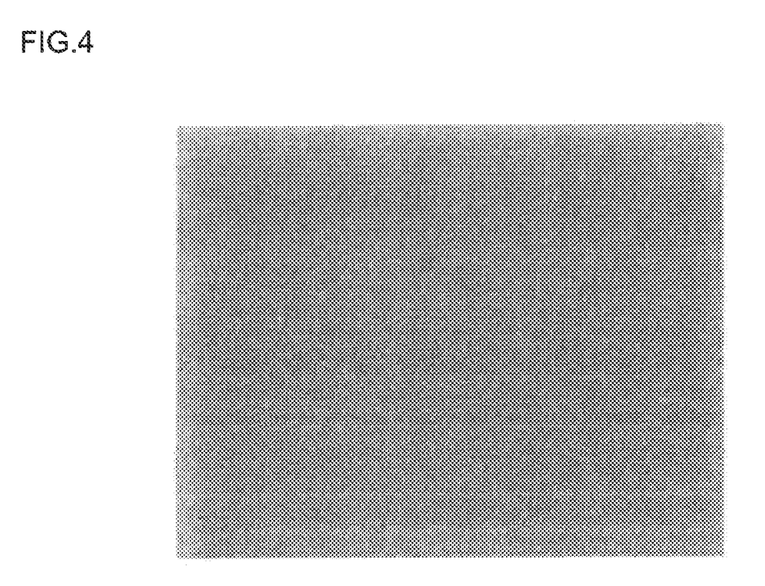
FIG. 4 is an SEM-EDX (energy-dispersive X-ray spectroscopy) image showing the elemental distribution for Zr in the positive electrode active material particles in Example 3.
Figure 5:
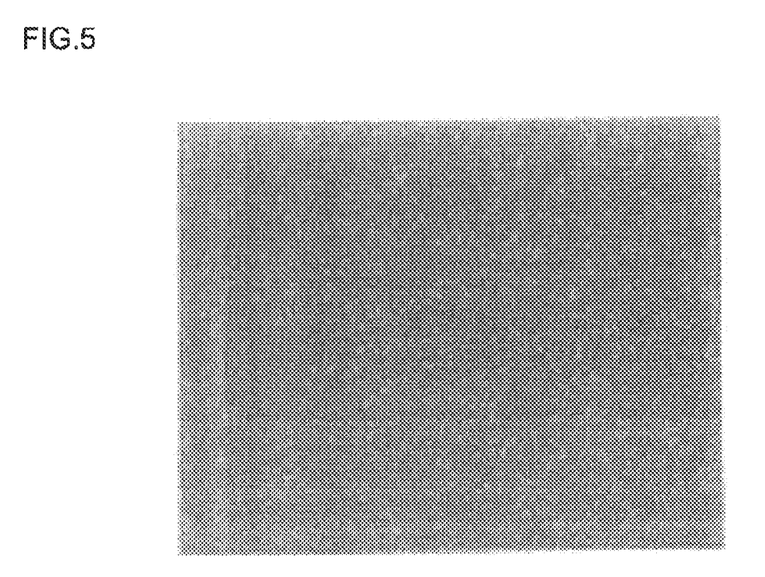
FIG. 5 is an SEM-EDX image showing the elemental distribution for W in the positive electrode active material particles of Example 3.
Figure 6:
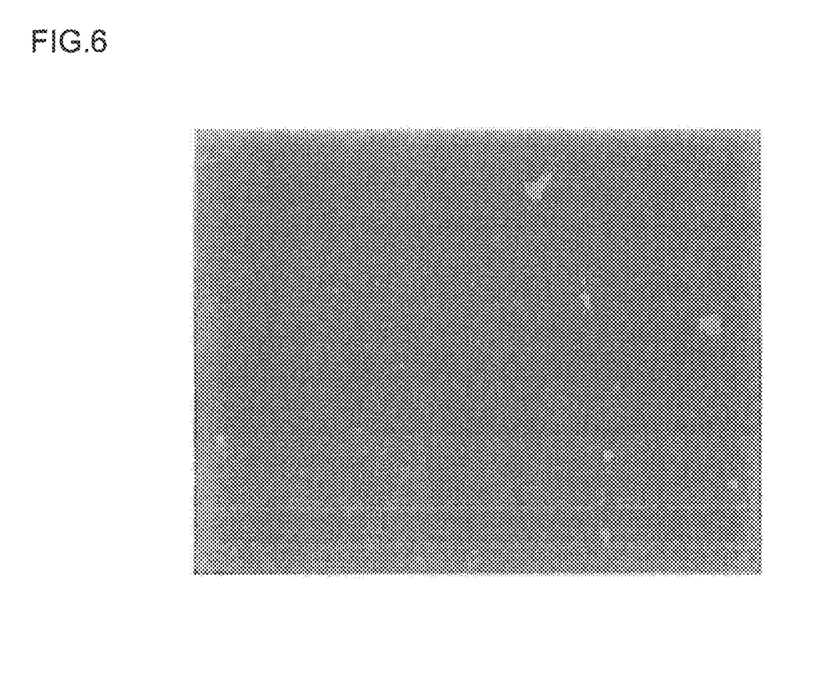
FIG. 6 is an SEM-EDX image showing the elemental distribution for Zr in the positive electrode active material particles of Example 6.
Figure 7:
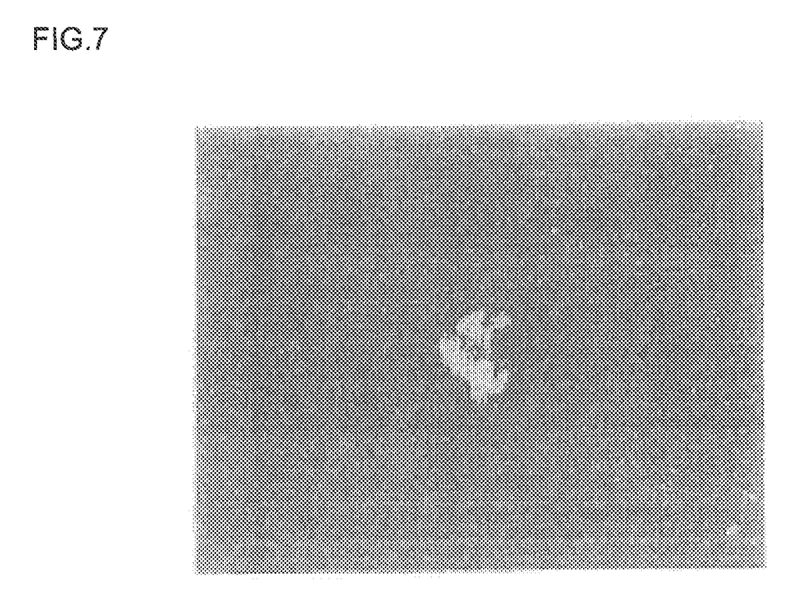
FIG. 7 is an SEM-EDX image showing the elemental distribution for W in the positive electrode active material particles of Example 6.

Each of the batteries, after being separately constructed for SEM-EDX analysis and subjected to initial charging, was discharged at a rate of 1 C to a voltage across the terminals of 3 V, then discharged for 3 hours at the same voltage. Following discharge, the battery was disassembled, and the positive electrode sheet was taken out and washed with diethyl carbonate (DEC). Using a SEM-EDX system (SEM: model S-5500, manufactured by Hitachi High Technologies; EDX: model Genesis 4000, manufactured by EDAX), images of the positive electrode plate surface were captured at a magnification of 1000×. Of these images, FIG. 4 shows an image of the elemental distribution for zirconium, and FIG. 5 shows an image of the elemental distribution for tungsten, on the surface of the positive electrode active material particles in Example 3. Similarly, FIG. 6 shows the elemental distribution for zirconium and FIG. 7 shows the elemental distribution for tungsten in Example 7.

TABLE 1

| | Positive electrode active material | | | Reaction resistance (mΩ) | | Capacity retention at 60° C. |
|---|---|---|---|---|---|---|
| | Elements added (mol %) | | Amount of eluted W | | | |
| Example | Zr | W | (mmol/g) | 25° C. | −30° C. | (%) |
| 1 | 0.50 | 0.50 | 0.012 | 1.22 | 0.81 | 90.5 |
| 2 | 0.20 | 0.50 | 0.011 | 1.19 | 0.79 | 91.0 |

TABLE 1-continued

| | Positive electrode active material | | | Reaction resistance (mΩ) | | Capacity retention at 60° C. |
|---|---|---|---|---|---|---|
| | Elements added (mol %) | | Amount of eluted W | | | |
| Example | Zr | W | (mmol/g) | 25° C. | −30° C. | (%) |
| 3 | 0.50 | 0.80 | 0.013 | 1.21 | 0.80 | 90.6 |
| 4 | 0.50 | 1.00 | 0.015 | 1.20 | 0.79 | 90.8 |
| 5 | 0.50 | 0.50 | 0.026 | 1.28 | 1.03 | 72.8 |
| 6 | 0.50 | 0.80 | 0.034 | 1.25 | 1.00 | 74.2 |

As shown in Table 1, the batteries in each of Examples 1 to 4 in which the positive electrode active material contained a total of 2 mol % or less of Zr and W and the amount of eluted W was 0.025 mmol/g or less, compared with the batteries in Examples 5 and 6 in which the positive electrode active material contained about the same amount of Zr and W and had an amount of eluted W in excess of 0.025 mmol/g, had lower reaction resistances, both at temperatures of 25° C. and −30° C., and had better power characteristics. Moreover, the capacity retention following high-rate charge-discharge cycles at 60° C. was high, being at least 90%, in the batteries in each of Examples 1 to 4. This demonstrated a marked superiority in durability at high temperatures compared with the batteries in Examples 5 and 6, in which the capacity retention was less than 75%.

As exemplified in FIGS. 4 and 5, segregation of the Zr element and the W element was not observable in SEM-EDX analysis of the surfaces of particles of the positive electrode active materials in Examples 1 to 4, indicating that these elements were uniformly distributed. By contrast, as exemplified in FIGS. 6 and 7, segregation (aggregation) of these elements was observed at the surfaces of particles of the positive electrode active materials in Examples 5 and 6. Moreover, when the distribution of W was mapped by carrying out TEM-EDX analysis, the positive electrode active materials in Examples 1 to 4 were all in the form of secondary particles composed of a plurality of agglomerated primary particles, and W was found to be disproportionately distributed at the surfaces of the primary particles.

Embodiments of the invention have been described in detail above, although it should be noted that these serve only to illustrate the invention and in no way limit the scope of the invention. Various modifications and changes to the embodiments described above are encompassed by the art as set forth in the accompanying claims.

REFERENCE SIGNS LIST

1 Vehicle
20 Coiled electrode assembly
30 Positive electrode sheet
32 Positive electrode current collector
34 Positive electrode active material layer
38 Positive electrode terminal
40 Negative electrode sheet
42 Negative electrode current collector
44 Negative electrode active material layer
48 Negative electrode terminal
50 Separator
100 Lithium ion secondary battery

The invention claimed is:

1. A lithium ion secondary battery comprising a positive electrode, a negative electrode and a nonaqueous electrolyte solution, wherein
the positive electrode comprises, as a positive electrode active material, a lithium-transition metal composite oxide having a layered structure,
the lithium-transition metal composite oxide is represented by general formula (I):

$$Li_xNi_aCo_bMn_cM'_dW_eO_2 \qquad (I)$$

where M' is at least one selected from among zirconium and aluminum; x satisfies the condition $1.0 \le x \le 1.25$; a, b, c, d and e satisfy conditions $a+b+c+d+e=1$ and $0.001 \le (d+e) \le 0.02$; at least one of a, b and c is larger than 0; d>0; and e>0,
the lithium-transition metal composite oxide comprises tungsten in an amount of 0.50 to 1.00 mol % and zirconium in an amount of 0.20 to 0.50 mol %, and
the positive electrode active material exhibits a tungsten elution of 0.020 mmol per gram or less, the tungsten elution being the amount of tungsten eluted into a filtrate in which a suspension of the positive electrode active material in water is filtered, as measured by inductively coupled plasma mass spectrometry (ICP-MS).

2. The lithium ion secondary battery according to claim 1, wherein M' is zirconium.

3. The lithium ion secondary battery according to claim 1, wherein d:e is from 2:1 to 1:10.

4. The lithium ion secondary battery according to claim 1, wherein
the positive electrode active material is in the form of secondary particles formed of agglomerated primary particles of a lithium-transition metal composite oxide having a layered structure, and
the tungsten present in the positive electrode active material is disproportionately present at the surface of the primary particles.

5. A method of producing the lithium ion secondary battery according to claim 1, the method comprising:
preparing an aqueous solution $Aq_A$ containing Mn and M';
preparing an aqueous solution $Aq_C$ containing tungsten;
mixing the aqueous solution $Aq_A$ and the aqueous solution $Aq_C$ under alkaline conditions and inducing the precipitation of a hydroxide containing Mn, M' and tungsten
mixing the hydroxide with a lithium compound to form a mixture; and
firing the mixture so as to produce a lithium-transition metal composite oxide.

6. A method of producing the lithium ion secondary battery according to claim 1, the method comprising:
(A) preparing a precursor (ii) represented by general formula (II)

$$Ni_aCO_bMn_cM'_dW_e(OH)_{2+\alpha} \qquad (II)$$

where M' is at least one selected from among zirconium and aluminum; a, b, c, d and e satisfy the conditions $a+b+c+d+e=1$ and $0.001 \le (d+e) \le 0.02$; at least one of a, b and c is larger than 0; d>0; e>0; and α satisfies the condition $0 \le \alpha \le 0.5$, by wet mixing, said wet mixing being conducted by adding at desired rates an aqueous solution containing a nickel salt, a cobalt salt, a manganese salt and an M'-containing salt at given respective concentrations and an aqueous solution containing a tungsten-containing salt at a given concentration to a basic aqueous solution having a pH between 11 and 14 so as to prepare a reaction mixture, then stirring the mixture; and (B) preparing a lithium-transition metal composite oxide (i) represented by general formula (I) by firing a mixture of the precursor (ii) and a lithium salt.

7. A vehicle comprising the lithium ion secondary battery according to claim 1.

8. The lithium ion secondary battery according to claim 1, wherein the positive electrode active material exhibits the tungsten elution of 0.015 mmol per gram or less.

9. The lithium ion secondary battery according to claim 1, wherein, in general formula (I), a satisfies $0.3<a<0.6$, b satisfies $0.1<b<0.4$ and c satisfies $0.1<c<0.4$.

10. The lithium ion secondary battery according to claim 1, wherein the positive electrode active material has an average particle size of 3.9 μm to 4.2 μm.

11. The lithium ion secondary battery according to claim 1, wherein the positive electrode active material has a tap density of 0.98 m²/g to 1.15 m²/g.

12. A lithium ion secondary battery comprising a positive electrode, a negative electrode and a nonaqueous electrolyte solution, wherein the positive electrode comprises, as a positive electrode active material, a lithium-transition metal composite oxide having a layered structure, the lithium-transition metal composite oxide is represented by general formula (I):

$$Li_xNi_aCo_bMn_cZr_dW_eO_2 \qquad (I)$$

where x satisfies the condition $1.0 \le x \le 1.25$; a, b, c, d and e satisfy conditions $a+b+c+d+e=1$ and $0.001 \le (d+e) \le 0.02$; a satisfies $0.3<a<0.6$, b satisfies $0.1<b<0.4$ c satisfies $0.1<c<0.4$, and e satisfies $0.0009 \le e \le 0.018$, the lithium-transition metal composite oxide comprises tungsten in an amount of 0.50 to 1.00 mol % and zirconium in an amount of 0.20 to 0.50 mol %, and the positive electrode active material exhibits a tungsten elution of 0.020 mmol per gram or less, the tungsten elution being the amount of tungsten eluted into a filtrate in which a suspension of the positive electrode active material in water is filtered, as measured by inductively coupled plasma mass spectrometry (ICP-MS).

* * * * *